(12) United States Patent
Sakuragi et al.

(10) Patent No.: US 12,142,980 B2
(45) Date of Patent: Nov. 12, 2024

(54) ELECTRIC MOTOR, COMPRESSOR, AND REFRIGERATION DEVICE

(71) Applicant: DAIKIN INDUSTRIES, LTD., Osaka (JP)

(72) Inventors: Takuya Sakuragi, Osaka (JP); Yusuke Irino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/374,346

(22) Filed: Sep. 28, 2023

(65) Prior Publication Data

US 2024/0022132 A1    Jan. 18, 2024

Related U.S. Application Data

(63) Continuation of application No. PCT/JP2022/016067, filed on Mar. 30, 2022.

(30) Foreign Application Priority Data

Mar. 31, 2021 (JP) .................................. 2021-060401

(51) Int. Cl.
*H02K 3/28* (2006.01)
*H02K 1/16* (2006.01)
*H02K 3/18* (2006.01)

(52) U.S. Cl.
CPC ................. *H02K 3/28* (2013.01); *H02K 1/16* (2013.01); *H02K 3/18* (2013.01)

(58) Field of Classification Search
CPC .................................. H02K 3/28; H02K 7/09

(Continued)

(56) References Cited

U.S. PATENT DOCUMENTS

2018/0248432 A1    8/2018   Ikeda et al.
2020/0350804 A1   11/2020   Ono et al.
2021/0115929 A1    4/2021   Nakazawa et al.

FOREIGN PATENT DOCUMENTS

CN        103944288 A     7/2014
CN        108141087 A     6/2016
(Continued)

OTHER PUBLICATIONS

International Preliminary Report of corresponding PCT Application No. PCT/JP2022/016067 dated Oct. 12, 2023.

(Continued)

*Primary Examiner* — Daniel C Puentes
*Assistant Examiner* — Minki Chang
(74) *Attorney, Agent, or Firm* — Global IP Counselors, LLP

(57) ABSTRACT

An electric motor includes a rotor and a stator having a stator core, a suspension winding group, and an armature winding group. The stator core includes a back yoke and a plurality of teeth. The suspension winding group includes a plurality of suspension windings wound on the teeth. The suspension windings generate an electromagnetic force that supports the rotor in a non-contact manner, and generate a magnetic pole inside the stator. The armature winding group includes a plurality of armature windings wound on the teeth. The armature windings generate an electromagnetic force that rotationally drives the rotor, and generate a magnetic pole inside the stator. One of the suspension or armature winding groups includes a plurality of series winding sets with a plurality of series connected windings of a same phase. Each series winding set is connected in parallel with an other one of the series winding sets.

9 Claims, 12 Drawing Sheets

(58) Field of Classification Search
USPC .......................................................... 310/90.5
See application file for complete search history.

(56) References Cited

FOREIGN PATENT DOCUMENTS

| | | | | |
|---|---|---|---|---|
| EP | 2634894 A1 * | 9/2013 | ............... | H02K 3/28 |
| JP | 6193377 B2 | 9/2017 | | |
| JP | 2018-61375 A | 4/2018 | | |
| JP | 2018-189358 A | 11/2018 | | |
| JP | 2019-83654 A | 5/2019 | | |
| WO | WO-2018207767 A1 * | 11/2018 | ............. | F04D 17/10 |

OTHER PUBLICATIONS

International Search Report of corresponding PCT Application No. PCT/JP2022/016067 dated Jun. 14, 2022.

* cited by examiner

ELECTRIC MOTOR, COMPRESSOR, AND REFRIGERATION DEVICE

CROSS-REFERENCE TO RELATED APPLICATIONS

This is a continuation of International Application No. PCT/JP2022/016067 filed on Mar. 30, 2022, which claims priority to Japanese Patent Application No. 2021-060401, filed on Mar. 31, 2021. The entire disclosures of these applications are incorporated by reference herein.

BACKGROUND

Technical Field

The present disclosure relates to an electric motor, a compressor, and a refrigeration apparatus.

Background Art

Japanese Patent No. 6193377 discloses an electric motor including a rotor and a stator. The stator includes a stator core and a suspension winding group. The stator core includes a circular back yoke and a plurality of teeth protruding radially inward of the back yoke. The suspension winding group includes a plurality of suspension windings which are wound on the associated teeth to pass through slots formed between the plurality of teeth; current is made to pass through the suspension windings to generate an electromagnetic force supporting the rotor in a non-contact manner, thereby generating a magnetic pole inside the stator. In this electric motor, two of the suspension windings are provided for each of phases. The suspension windings of the same phase are connected together in parallel.

SUMMARY

A first aspect of the present disclosure is directed to an electric motor including: a rotor and a stator. The stator includes a stator core, a suspension winding group, and an armature winding group. The stator core includes a back yoke in a circular shape and a plurality of teeth protruding radially inward of the back yoke. The suspension winding group includes a plurality of suspension windings wound on the teeth so as to pass through slots, each formed between the plurality of teeth, the suspension windings generating an electromagnetic force that supports the rotor in a non-contact manner due to passage of current, and the suspension windings generating a magnetic pole inside the stator, The armature winding group includes a plurality of armature windings wound on the teeth so as to pass through the slots, each formed between the plurality of teeth, the armature windings generating an electromagnetic force that rotationally drives the rotor by passage of current, the armature windings generating a magnetic pole inside the stator. One of the suspension winding group or the armature winding group includes a plurality of series winding sets that each include a plurality of windings of a same phase connected together in series. Each series winding set is connected in parallel with an other one of the series winding sets of a same phase as that of the series winding set.

DETAILED DESCRIPTION OF EMBODIMENT(S)

Embodiments of the present disclosure will be described below with reference to the drawings. The following embodiments are merely exemplary ones in nature, and are not intended to limit the scope, applications, or use of the present invention.

First Embodiment

Configuration of Refrigeration Apparatus

Figure 1:
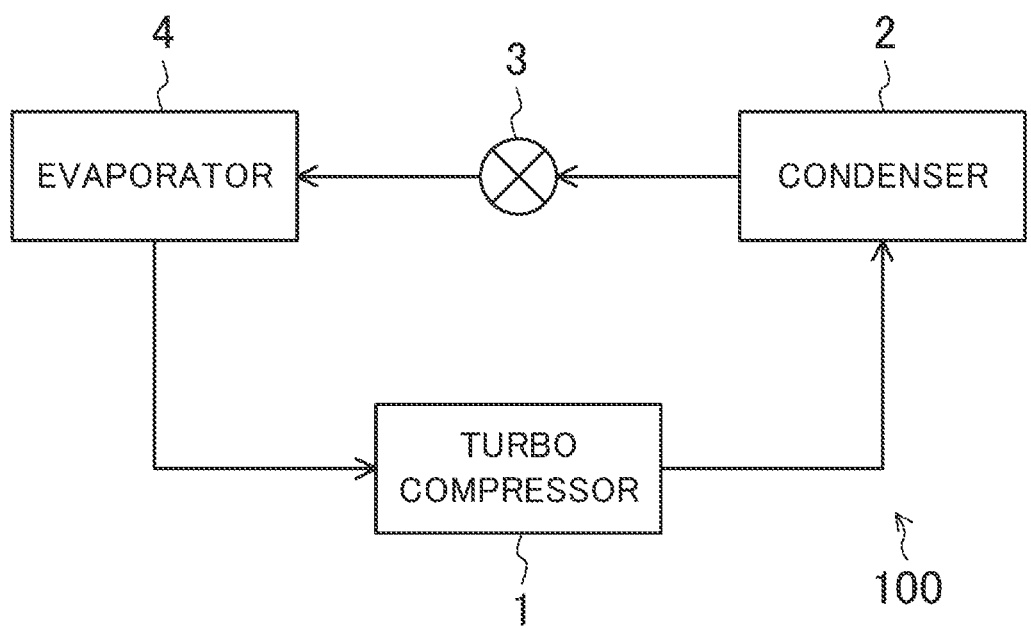
FIG. 1 is a block diagram showing a configuration of a refrigeration apparatus according to a first embodiment.

FIG. 1 is a schematic view illustrating a refrigerant circuit of a refrigeration apparatus (100) according to this embodiment.

As illustrated in FIG. 1, the refrigeration apparatus (100) includes a turbo compressor (1) of this embodiment, a condenser (2), an expansion mechanism (3), and an evaporator (4). The refrigeration apparatus (100) performs an operation of a refrigeration cycle in which a refrigerant circulates in a refrigerant circuit shown in FIG. 1. Specifically, the refrigerant discharged from the turbo compressor (1) is introduced into the turbo compressor (1) through the condenser (2), the expansion mechanism (3), and the evaporator (4).

Configuration of Compressor

Figure 2:
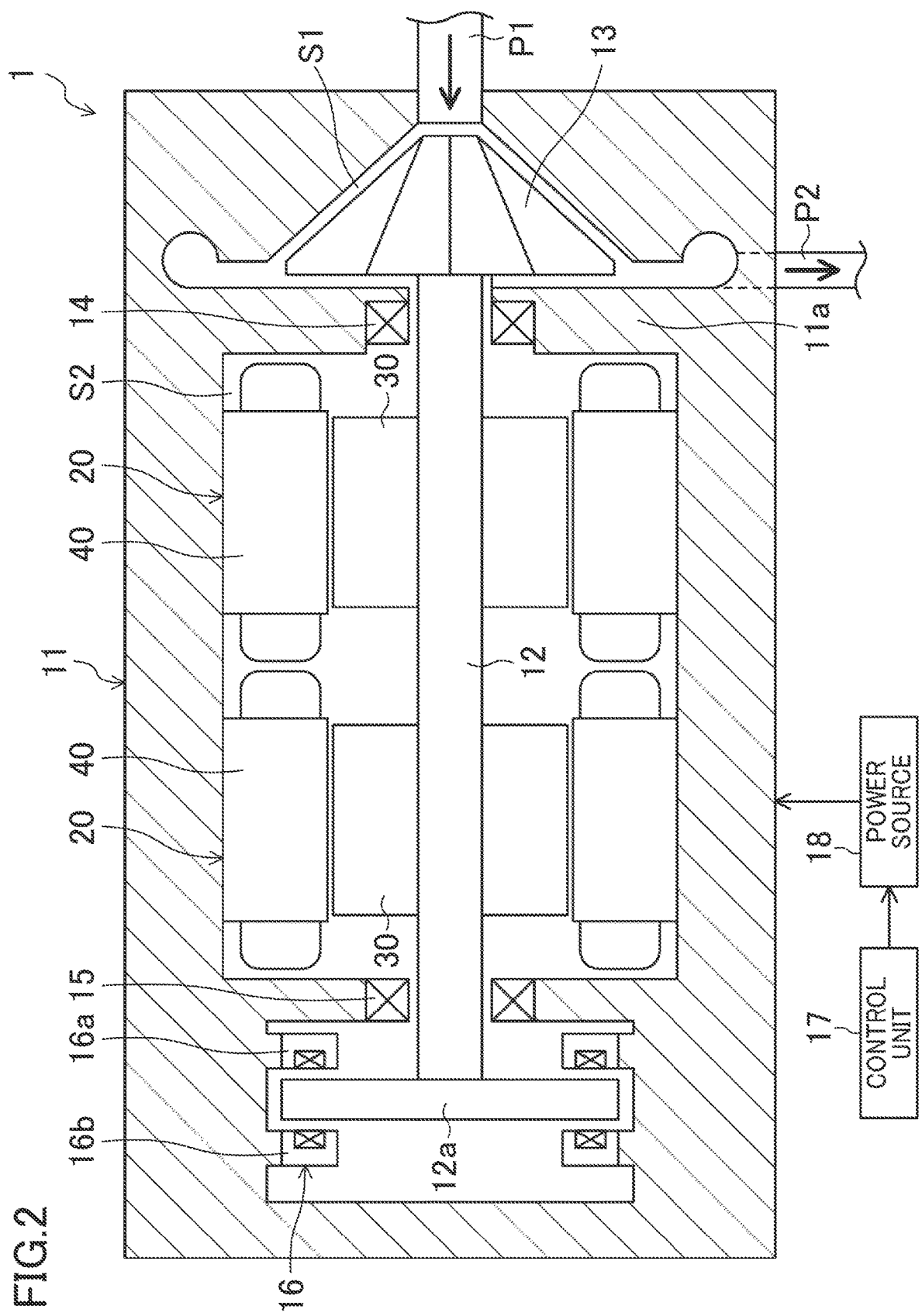
FIG. 2 is a vertical cross-sectional view illustrating a configuration of a turbo compressor according to the first embodiment.

FIG. 2 illustrates a configuration of the turbo compressor (1) according to the embodiment. The turbo compressor (1) is provided in the refrigerant circuit (not shown) and is configured to compress the refrigerant. In this example, the turbo compressor (1) includes a casing (11), a drive shaft (12), an impeller (13), one or more (in this example, two)

bearingless motors (20) serving as electric motors, a first touchdown bearing (14), a second touchdown bearing (15), a thrust magnetic bearing (16), a control unit (17), and a power source (18).

In the following description, an "axial direction" refers to a direction of an axis, i.e., a direction of an axial center of the drive shaft (12), and a "radial direction" refers to a direction orthogonal to the axial direction of the drive shaft (12). An "outer circumferential side" refers to a side farther from the axial center of the drive shaft (12), while an "inner circumferential side" refers to a side closer to the axial center of the drive shaft (12).

Casing

The casing (11) is formed into a cylindrical shape with its both ends closed, and is arranged such that its axial direction extends horizontally. Space in the casing (11) is divided by a wall portion (11a) into a space on the right side of the wall portion (11a) and a space on the left side of the wall portion (11a). The space on the right side of the wall portion (11a) constitutes an impeller chamber (S1) that houses the impeller (13). The space on the left side of the wall portion (11a) constitutes a motor chamber (S2) that houses the bearingless motors (20). The motor chamber (S2) houses the bearingless motors (20), the first touchdown bearing (14), the second touchdown bearing (15), and the thrust magnetic bearing (16), which are fixed to the inner circumferential wall of the motor chamber (S2).

Drive Shaft

The drive shaft (12) is intended to rotationally drive the impeller (13). In this example, the drive shaft (12) extends through the casing (11) in the axial direction to couple the impeller (13) and the bearingless motors (20) together. Specifically, the impeller (13) is fixed to one end portion of the drive shaft (12), and the bearingless motors (20) are arranged on an intermediate portion of the drive shaft (12). The other end portion of the drive shaft (12) (i.e., an end portion opposite to the one end portion to which the impeller (13) is fixed) is provided with a disk-shaped portion (hereinafter referred to as the "disk portion (12a)"). The drive shaft (12) is made of a magnetic material (e.g., iron).

Impeller

The impeller (13) has a plurality of blades to have a substantially conical outer shape, and is coupled to the drive shaft (12). In this example, the impeller (13) is housed in the impeller chamber (S1) while being fixed to the one end portion of the drive shaft (12). A suction pipe (P1) and a discharge pipe (P2) are connected to the impeller chamber (S1). The suction pipe (P1) is intended to introduce the refrigerant (fluid) from the outside into the impeller chamber (S1). The discharge pipe (P2) is intended to return the high-pressure refrigerant (fluid) compressed in the impeller chamber (S1) to the outside. In other words, in this example, the impeller (13) and the impeller chamber (S1) constitute a compression mechanism.

Bearingless Motor (Electric Motor)

The bearingless motors (20) each include a rotor (30) and a stator (40), and are configured to support the drive shaft (12) in a non-contact manner using electromagnetic force and to rotationally drive the drive shaft (12) using the electromagnetic force. The rotor (30) is fixed to the drive shaft (12), and the stator (40) is fixed to the inner circumferential wall of the casing (11). In this example, the two bearingless motors (20) are arranged to be aligned in the axial direction of the drive shaft (12). The configuration of each bearingless motor (20) will be described later in detail.

Thrust Magnetic Bearing

The thrust magnetic bearing (16) includes first and second thrust electromagnets (16a, 16b) and is configured to support the disk portion (12a) of the drive shaft (12) in a non-contact manner using electromagnetic force. Specifically, the first and second thrust electromagnets (16a, 16b) each include a ring-shaped stator core and windings (wires), face each other with the disk portion (12a) of the drive shaft (12) interposed therebetween, and support the disk portion (12a) of the drive shaft (12) in a non-contact manner using a synthesis of the electromagnetic forces generated by the first and second thrust electromagnets (16a, 16b). In other words, by controlling current flowing through each of the first and second thrust electromagnets (16a, 16b), it is possible to control the synthesis of the electromagnetic forces generated by the first and second thrust electromagnets (16a, 16b) and thereby control the position of the drive shaft (12) in the direction in which the first and second thrust electromagnets (16a, 16b) face each other (i.e., in the axial direction, or in the lateral direction in FIG. 1).

Various Sensors

Components of the turbo compressor (1) are provided with various types of sensors (not shown), such as a position sensor, a current sensor, or a rotational speed sensor. For example, the bearingless motors (20) are each provided with a position sensor (not shown) that outputs a detection signal corresponding to the position of the rotor (30) in the radial direction (the direction of the diameter). The thrust magnetic bearing (16) is provided with a position sensor (not shown) that outputs a detection signal corresponding to the position of the drive shaft (12) in the thrust direction (the axial direction). These position sensors are configured, for example, as eddy-current displacement sensors each of which detects the gap (distance) between the sensor and the measurement target.

Control Uni

The control unit (17) is configured to create a motor voltage command value and a thrust voltage command value, and output these command values, based on the detection signals from the various types of sensors provided for the components of the turbo compressor (1) or information such as a target rotational speed of the drive shaft (12) so that the rotational speed of the drive shaft (12) reaches a predetermined target rotational speed while the drive shaft (12) is supported in a non-contact manner. The motor voltage command value is a command value for controlling the voltage to be supplied to the windings (wires) of the stator (40) of each bearingless motor (20). The thrust voltage command value is a command value for controlling the voltage to be supplied to the windings (wires) of the first and second thrust electromagnets (16a, 16b) of the thrust magnetic bearing (16). The control unit (17) is configured, for example, as a processor, such as a central processing unit (CPU), or a storage, such as a memory that stores programs and information for operating the processor.

Power Source

The power source (18) is configured to supply a voltage to the windings (wires) of the stators (40) of the bearingless motors (20) and the windings (wires) of the first and second thrust electromagnets (16a, 16b) of the thrust magnetic bearing (16), based on the motor voltage command value and the thrust voltage command value that are output from the control unit (17). For example, the power source (18) is configured as a pulse width modulation (PWM) amplifier.

By controlling the voltage to be applied to the windings (wires) of the stator (40) of each bearingless motor (20), it is possible to control the current flowing through the windings (wires) of the stator (40) and thereby control the magnetic flux generated by the bearingless motor (20). In addition, by controlling the voltage supplied to the windings (wires) of the first and second thrust electromagnets (16a, 16b) of the thrust magnetic bearing (16), it is possible to control the current flowing through the windings (wires) of the first and second thrust electromagnets (16a, 16b) and thereby control the synthesis of the electromagnetic forces generated by the first and second thrust electromagnets (16a, 16b).

Configuration of Bearingless Motor

Figure 3:
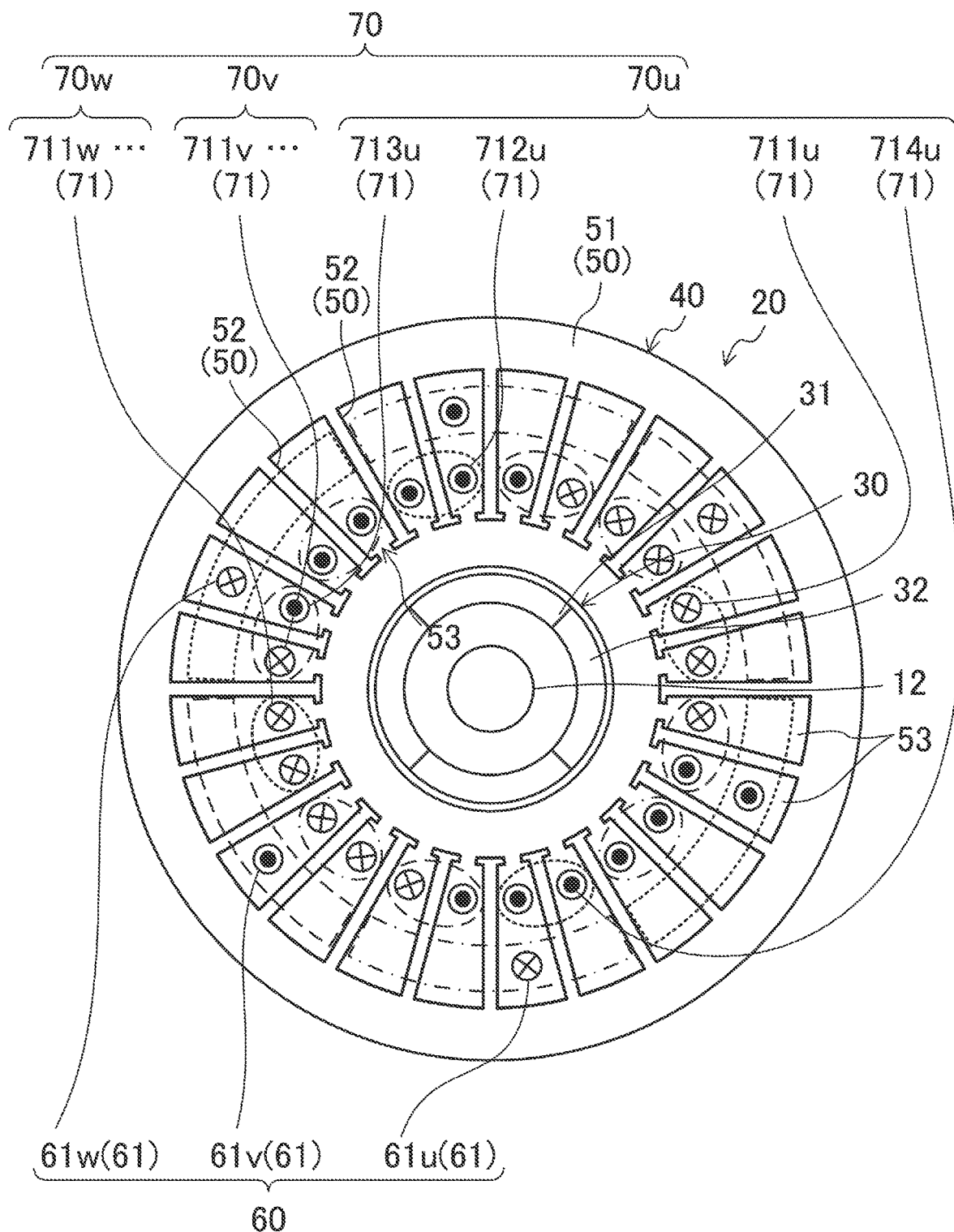
FIG. 3 is a transverse sectional view illustrating a configuration of a bearingless motor according to the first embodiment.

FIG. 3 illustrates a configuration of a bearingless motor (20). In this example, the bearingless motor (20) constitutes an interior magnet bearingless motor.

Rotor

The rotor (30) includes a rotor core (31) and a four-pole permanent magnet (32) provided in the rotor core (31).

Rotor Core

The rotor core (31) is made of a magnetic material (e.g., a laminated steel plate), and is formed into a columnar shape. A shaft hole for receiving the drive shaft (12) is formed in the center of the rotor core (31).

Permanent Magnet

The four-pole permanent magnet (32) is embedded near the outer circumferential surface (in an outer circumferential portion) of the rotor core (31), and is placed such that N and S poles alternate near the outer circumferential surface at intervals of 90 degrees in the circumferential direction.

Stator

The stator (40) includes a stator core (50), a suspension winding group (60), and an armature winding group (70).

Stator Core

The stator core (50) is made of a magnetic material (for example, a laminated steel plate), and includes a back yoke (51) and a plurality of (in this example, 24) teeth (52). The back yoke (51) is formed in a circular shape (in this example, a ring shape). The plurality of teeth (52) protrude radially inward of the back yoke (51). The plurality of teeth (52) are arranged at predetermined intervals in the circumferential direction of the stator (40). With such a configuration, a slot (53) through which an associated one of suspension windings (61) constituting the suspension winding group (60) and an associated one of armature windings (71) constituting the armature winding group (70) pass is formed between a pair of teeth (52) adjacent to each other in the circumferential direction of the stator (40). In other words, there are multiple (in this example, 24) slots (53) formed between the plurality of (in this example, 24) teeth (52) arranged in the circumferential direction of the stator (40).

Suspension Winding Group

The suspension winding group (60) includes a plurality of suspension windings (61) made of an electric conductor, such as copper. The suspension windings (61) are wound on the teeth (52) by a distributed winding method so as to pass through the slots (53) each formed between the plurality of teeth (52), generate an electromagnetic force that supports the rotor (30) in a non-contact manner due to the passage of current, and generate a magnetic pole inside the stator (40). Each suspension winding (61) is wound around one winding axis.

The suspension winding group (60) includes a U-phase suspension winding (61u), a V-phase suspension winding (61v), and a W-phase suspension winding (61w).

Figure 4:
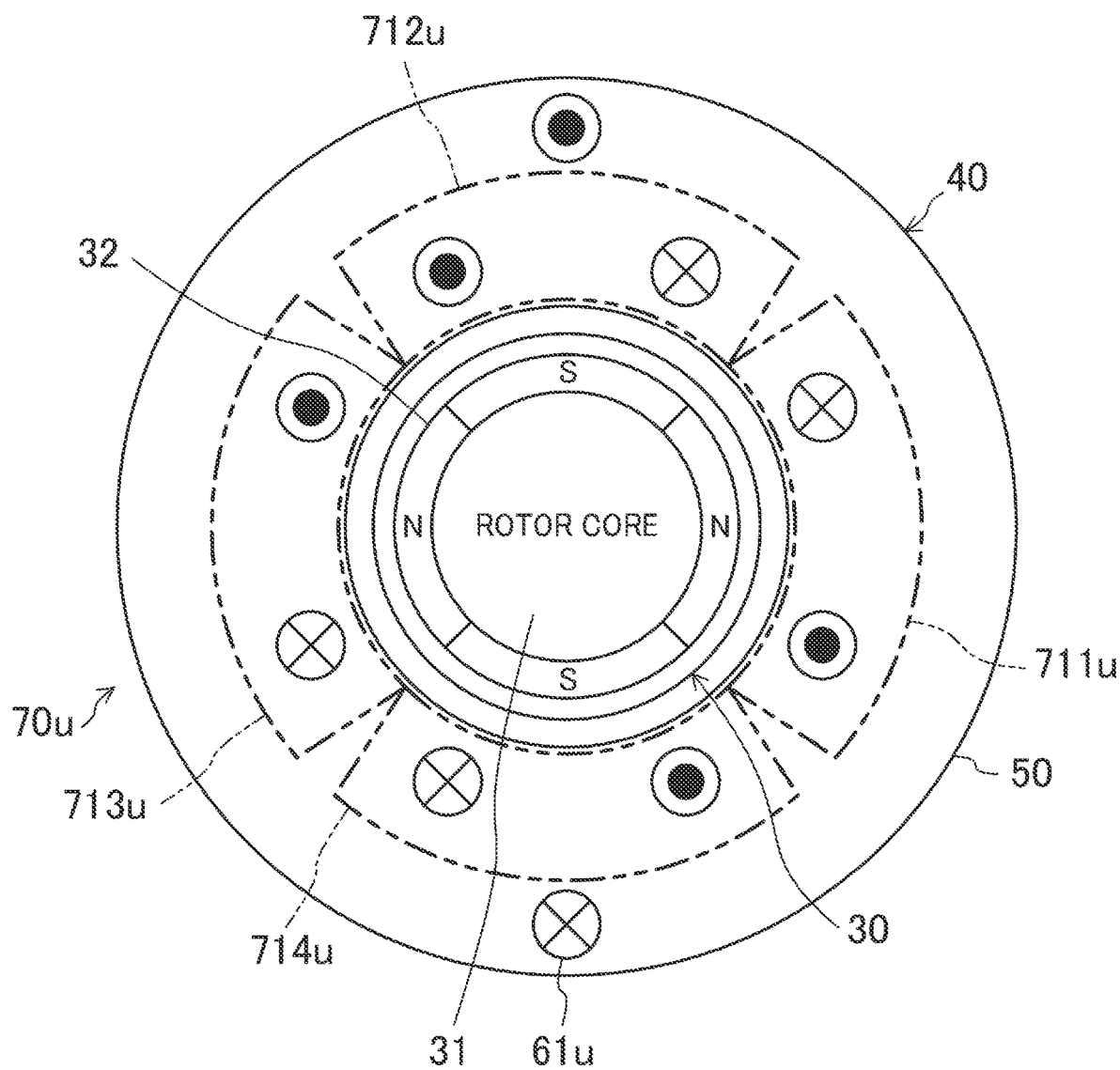
FIG. 4 is a transverse sectional view showing the directions of current flowing through a U-phase suspension winding group and a U-phase armature winding group according to the first embodiment.

As illustrated also in FIG. 4, the U-phase suspension winding (61u) is wound on the teeth (52) so as to pass through the two slots (53) opposed to each other. Likewise, each of the V-phase and W-phase suspension windings (61v, 61w) is also wound on the teeth (52) so as to pass through the two slots (53) opposed to each other.

Armature Winding Group

The armature winding group (70) includes a plurality of armature windings (71) made of an electric conductor, such as copper. The armature windings (71) are wound on the teeth (52) by the distributed winding method so as to pass through the slots (53) each formed between the plurality of teeth (52), generate an electromagnetic force rotationally driving the rotor (30) due to the passage of current, and generate a magnetic pole inside the stator (40). Each armature winding (71) is wound around one winding axis.

The armature winding group (70) includes a U-phase armature winding group (70u), a V-phase armature winding group (70v), and a W-phase armature winding group (70w).

As illustrated in FIG. 4, the U-phase armature winding group (70u) includes first to fourth U-phase armature windings (711u to 714u). The first to fourth U-phase armature windings (711u to 714u) are spaced apart from one another equally in the circumferential direction and sequentially in a counterclockwise direction such that the winding axes of the armature windings (711u to 714u) adjacent to each other form an angle of 90°.

Figure 5:
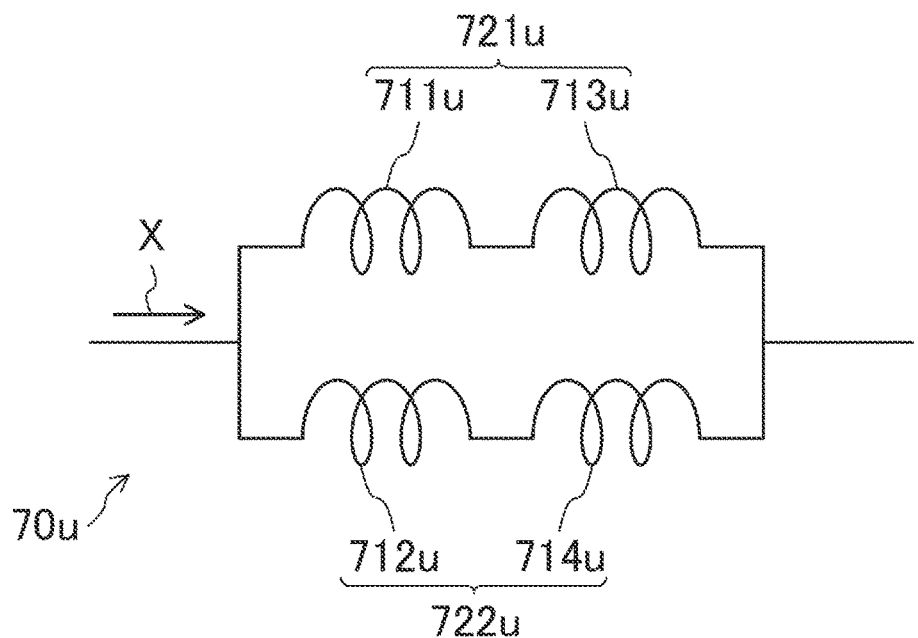
FIG. 5 is a circuit diagram of the U-phase armature winding group according to the first embodiment.

As illustrated in FIG. 5, the U-phase armature winding group (70u) includes a first U-phase series armature winding set (721u) and a second U-phase series armature winding set (722u). The first U-phase series armature winding set (721u) includes the first and third U-phase armature windings (711u, 713u) connected together in series. The second U-phase series armature winding set (722u) includes the second and fourth U-phase armature windings (712u, 714u) connected together in series. Each U-phase series armature winding set (721u, 722u) includes two of the armature windings (711u to 714u) arranged such that the winding axes of the armature windings (711u to 714u) adjacent to each other form an angle of 180°. Each U-phase series armature winding set (721u, 722u) is configured as one sub-winding set including two (k) of the armature windings (711u to 714u) arranged such that the winding axes of the armature windings (711u to 714u) adjacent to each other form an angle of 180° (360°/k, where k=2). The first and second U-phase series armature winding sets (721u, 722u) are connected together in parallel. That is, each U-phase series armature winding set (721u, 722u) is connected in parallel with a series armature winding set of the same phase as the U-phase series armature winding set (721u, 722u), i.e., the other U-phase series armature winding set (721u, 722u).

The V-phase and W-phase armature winding groups (70v, 70w) are configured similarly to the U-phase armature winding group (70u).

The armature winding group (70) is not connected to the suspension winding group (60), and is independent of the suspension winding group (60).

Operation of Bearingless Motor

Each bearingless motor (20) generates electromagnetic forces for rotating the drive shaft (12) by an interaction between a magnet magnetic flux produced by the permanent magnet (32) of the bearingless motor (20) and a driving magnetic flux generated in accordance with current flowing through the armature winding group (70).

FIG. 4 shows the directions of current flowing through the first to fourth U-phase armature windings (711u to 714u) when a positive current flows in the direction indicated by the arrow X in FIG. 5.

The bearingless motor (20) generates electromagnetic forces for supporting the drive shaft (12) in a non-contact manner by an interaction between the magnet magnetic flux and a suspension magnetic flux generated in accordance with current flowing through the suspension winding group (60).

FIG. 4 shows the directions of current which flows when current flows through the U-phase suspension winding (61*u*) in a predetermined direction.

For example, when the current flowing through the suspension winding group (60) changes, induced voltages (induced electromotive force) appear in the first to fourth U-phase armature windings (711*u* to 714*u*) to cancel the change in current and a change in magnetic flux corresponding to the magnet magnetic flux. At this time, induced voltages with different absolute values appear in the first and third U-phase armature windings (711*u*, 713*u*), and induced voltages with different absolute values appear in the second and fourth U-phase armature windings (712*u*, 714*u*). The total voltage of the induced voltages produced in the first and third U-phase armature windings (711*u*, 713*u*) by the changes in the current flowing through the suspension winding group (60) and the magnet magnetic flux corresponds to a voltage across the first U-phase series armature winding set (721*u*). The total voltage of the induced voltages produced in the second and fourth U-phase armature windings (712*u*, 714*u*) by the changes in the current flowing through the suspension winding group (60) and the magnet magnetic flux corresponds to a voltage across the second U-phase series armature winding set (722*u*).

Such wiring can decrease the difference between the induced voltages produced in the first and second U-phase series armature winding sets (721*u*, 722*u*) by the magnetic flux generated by the current passing through the suspension winding group (60) and the magnet magnetic flux. This can reduce the circulating current flowing due to the voltage difference between the first and second U-phase series armature winding sets (721*u*, 722*u*).

The V-phase and W-phase armature winding groups (70*v*, 70*w*) operate similarly to the U-phase armature winding group (70*u*). It is thus possible to reduce the circulating current through the V-phase and W-phase armature winding groups (70*v*, 70*w*) as well.

A large circulating current flowing through the armature winding group (70) may lead to an unbalanced magnetic flux of the armature winding group (70), which may result in a disturbance of the magnetic flux to be controlled by the suspension winding group (60) and prevent the rotor (30) from being supported. In the first embodiment, the circulating current can be reduced as described above. It is thus possible to support the rotor (30) more reliably.

Figure 6:
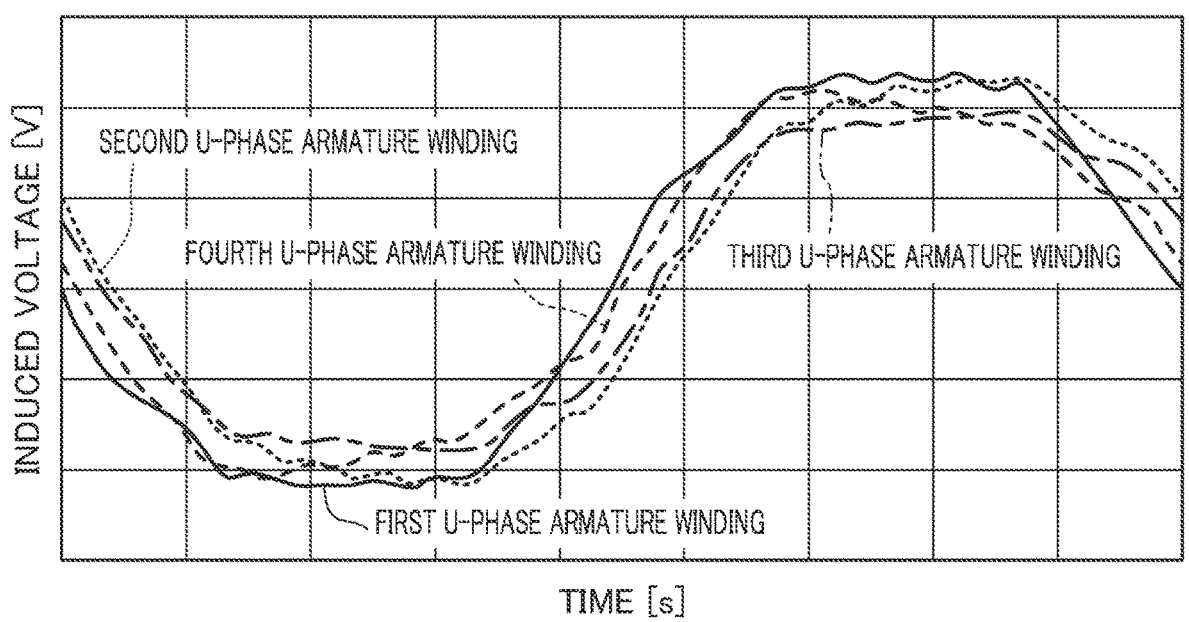
FIG. 6 is a timing diagram illustrating the induced voltage generated in each of first to fourth U-phase armature windings by rotating a rotor and making current flow through a suspension winding group.

FIG. 6 illustrates the induced voltages generated in the first to fourth U-phase armature windings (711*u* to 714*u*) when the rotor (30) is rotated to cause a current to flow through the suspension winding group (60).

Figure 7:
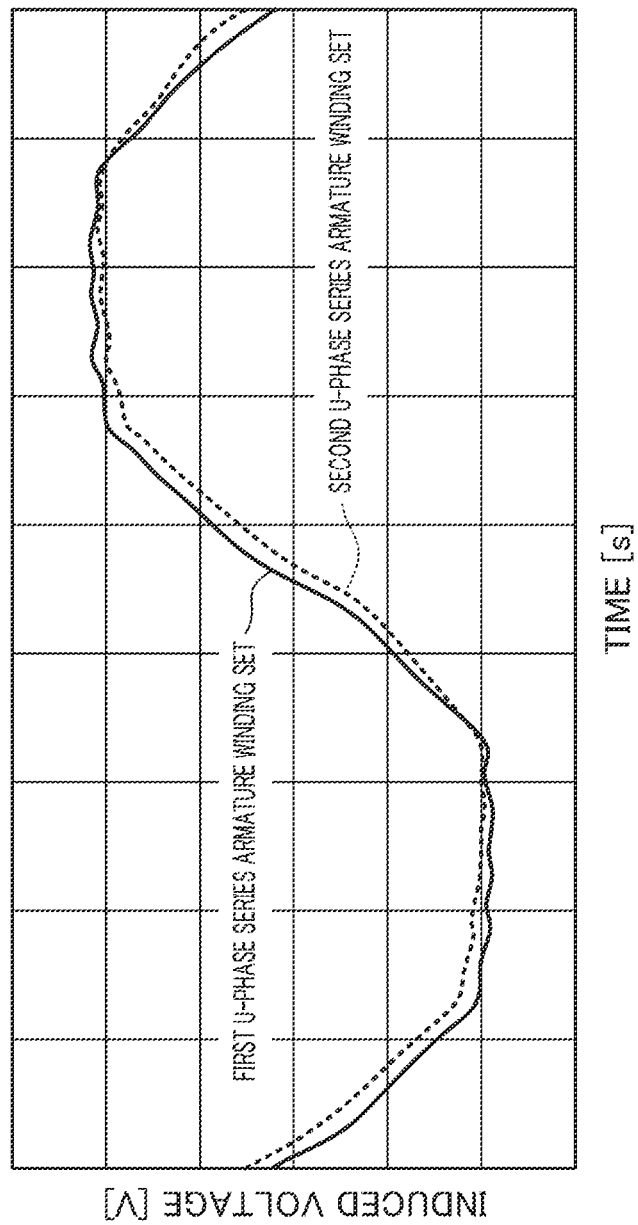
FIG. 7 is a timing diagram illustrating the induced voltage generated in each of first and second U-phase series armature winding sets by rotating the rotor and making current flow through the suspension winding group.

FIG. 7 illustrates the induced voltages generated in the first and second U-phase series armature winding sets (721*u*, 722*u*) when the rotor (30) is rotated to cause a current to flow through the suspension winding group (60).

In the first embodiment, a maximum value of the absolute values of the deviations of the amplitude values of the induced voltages appearing individually in the plurality of U-phase (same phase) series armature winding sets (721*u*, 722*u*) connected together in parallel based on the magnetic flux generated when a current flows through the suspension winding group (60) is ⅓ or less of a maximum value of the absolute values of the deviations of the amplitude values of the induced voltages appearing individually in the armature windings (711*u* to 714*u*) included in the plurality of U-phase series armature winding sets (721*u*, 722*u*) connected together in parallel based on the magnetic flux generated when a current flows through the suspension winding group (60).

To be more specific, first, the average value of the amplitude values of the induced voltages of the U-phase armature windings (711*u* to 714*u*) is expressed by the following Expression 1, where $\text{Vamp}_{Ui}$ represents the amplitude value of the induced voltage generated in the i-th U-phase armature winding (71*iu*) when the rotor (30) is rotated to cause a current to flow through the suspension winding group (60). In Expression 1, n represents the number of the U-phase armature windings (711*u* to 714*u*).

Math 1

$$\overline{\text{Vamp}_U} = \frac{1}{n}\sum_{i=1}^{n} \text{Vamp}_{U1} \quad \text{(Expression 1)}$$

The average value of the amplitude values of the induced voltages of the U-phase series armature winding sets (721*u*, 722*u*) is expressed by the following Expression 2, where $\text{Vamp}_{Ugi}$ represents the amplitude value of the induced voltage generated in the i-th U-phase series armature winding set (72*iu*). In Expression 2, m represents the number of the U-phase series armature winding sets (721*u*, 722*u*).

Math 2

$$\overline{\text{Vamp}_{Ug}} = \frac{1}{m}\sum_{i=1}^{m} \text{Vamp}_{Ugi} \quad \text{(Expression 2)}$$

Then, the following Expression 3 holds true.

Math 3

$$\frac{\max\{|\overline{\text{Vamp}_{Ug}} - \text{Vamp}_{Ug1}|, \cdots |\overline{\text{Vamp}_{Ug}} - \text{Vamp}_{Ugm}|\}}{\max\{|\overline{\text{Vamp}_U} - \text{Vamp}_{U1}|, |\overline{\text{Vamp}_U} - \text{Vamp}_{U2}|, \cdots |\overline{\text{Vamp}_U} - \text{Vamp}_{Un}|\}} \leq \frac{1}{3} \quad \text{(Expression 3)}$$

In other words, the maximum value of the absolute values of the deviations of the amplitude values of the induced voltages appearing individually in the first and second U-phase series armature winding sets (721*u*, 722*u*) based on the magnetic flux generated when a current flows through the suspension winding group (60) is ⅓ or less of the maximum value of the absolute values of the deviations of the amplitude values of the induced voltages appearing individually in the first to fourth U-phase armature windings (711*u* to 714*u*) included in the first and second U-phase series armature winding sets (721*u*, 722*u*) based on the magnetic flux generated when a current flows through the suspension winding group (60). This relationship holds true also for the V-phase and W-phase armature winding groups (70*v*, 70*w*).

In the first embodiment, the maximum value of the absolute value of the difference between the induced voltages appearing individually in the plurality of U-phase (same phase) series armature winding sets (721*u*, 722*u*) connected together in parallel based on the magnetic flux generated when a current flows through the suspension winding group (60) is ½ or less of a maximum value of the absolute values of the differences among the induced voltages appearing individually in the armature windings (711u to 714u) included in the plurality of U-phase series armature winding sets (721u, 722u) connected together in parallel based on the magnetic flux generated when a current flows through the suspension winding group (60). Thus, the maximum value of the absolute value of the difference between the induced voltages appearing individually in the plurality of U-phase series armature winding sets (721u, 722u) connected together in parallel based on the magnetic flux generated when a current flows through the suspension winding group (60) is less than the maximum value of the absolute values of the differences among the induced voltages appearing individually in the armature windings (711u to 714u) included in the plurality of U-phase series armature winding sets (721u, 722u) connected together in parallel based on the magnetic flux generated when a current flows through the suspension winding group (60).

To be more specific, first, the absolute values of the differences among the induced voltages appearing individually in the armature windings (711u to 714u) can be expressed as $|V_{u1}-V_{u2}|$, $|V_{u1}-V_{u3}|$, $|V_{u1}-V_{u4}|$, $|V_{u2}-V_{u3}|$, $|V_{u2}-V_{u4}|$, and $|V_{u3}-V_{u4}|$, where $V_{un}$ represents the induced voltage appearing in the n-th U-phase armature winding (71nu) while the rotor (30) is rotationally driven.

The maximum values among absolute values, at predetermined time intervals, of the differences among the induced voltages appearing individually in the armature windings (711u to 714u) (i.e., the maximum values among values, at predetermined time intervals, of $|V_{u1}-V_{u2}|$, $|V_{u1}-V_{u3}|$, $|V_{u1}-V_{u4}|$, $|V_{u2}-V_{u3}|$, $|V_{u2}-V_{u4}|$, and $|V_{u3}-V_{u4}|$) are defined as max$|V_{u1}-V_{u2}|$, max$|V_{u1}-V_{u3}|$, max$|V_{u1}-V_{u4}|$, max$|V_{u2}-V_{u3}|$, max$|V_{u2}-V_{u4}|$, and max$|V_{u3}-V_{u4}|$. The absolute values, at predetermined time intervals, of the differences among the induced voltages appearing individually in the armature windings (711u to 714u) can be obtained by measuring, at predetermined time intervals during a half turn of the rotor (30), for example, the absolute values of the differences among the induced voltages appearing in the armature windings (711u to 714u).

In addition, a maximum value among max$|V_{u1}-V_{u2}|$, max$|V_{u1}-V_{u3}|$, maxi $V_{u1}-V_{u4}|$, max$|V_{u2}-V_{u3}|$, max$|V_{u2}-V_{u4}|$, and max$|V_{u3}-V_{u4}|$ (i.e., a maximum value among the absolute values of the differences among the induced voltages appearing in the U-phase armature windings (711u to 714u)) is defined as Vdiff_max$_u$.

On the other hand, the induced voltage appearing in the n-th U-phase series armature winding set (72nu) is expressed as $V_{ugn}$. Thus, the absolute value of the difference between the induced voltages appearing individually in the U-phase series armature winding sets (721u, 722u) (i.e., the absolute value of the difference between the induced voltages appearing in the first and second U-phase series armature winding sets (721u, 722u)) can be expressed as $|V_{ug1}-V_{ug2}|$.

A maximum value of the absolute values, at predetermined time intervals, of the differences between the induced voltages appearing individually in the U-phase series armature winding sets (721u, 722u) (i.e., a maximum value of the values $|V_{ug1}-V_{ug2}|$ at the predetermined time intervals) is defined as max$|V_{ug1}-V_{ug2}|$. The following expression stands, where Vdiff_max$_{Ug}$ represents the maximum value of the absolute value of the difference between the induced voltages appearing individually in the U-phase series armature winding sets (721u, 722u).

Vdiff_max$_{Ug}$=max$|V_{ug1}-V_{ug2}|$

Then, the following Expression 4 holds true.

Math 4

$$\text{Vdiff\_max}_{Ug} \leq \frac{\text{Vdiff\_max}_U}{2} \quad \text{(Expression 4)}$$

In other words, the maximum value of the absolute value of the difference between the induced voltages appearing individually in the first and second U-phase series armature winding sets (721u, 722u) connected together in parallel based on the magnetic flux generated when a current flows through the suspension winding group (60) is ½ or less of the maximum value of the absolute values of the differences among the induced voltages appearing individually in the first to fourth U-phase armature windings (711u to 714u) included in the first and second U-phase series armature winding sets (721u, 722u) connected together in parallel based on the magnetic flux generated when a current flows through the suspension winding group (60). This relationship holds true also for the V-phase and W-phase armature winding groups (70v, 70w).

Thus, in the first embodiment, since the armature winding group (70) includes the plurality of series armature winding sets (721u, 722u) including the plurality of armature windings (711u to 714u) of the same phase, it is possible to make a connecting wire shorter than in a case in which all of the armature windings (71) of the same phase constituting the armature winding group (70) are connected together in parallel. This can reduce the size of the bearingless motor (20).

Further, since the plurality of U-phase series armature winding sets (721u, 722u) of the same phase are connected together in parallel, it is possible to more finely adjust the voltage between both terminals of the armature winding group (70u, 70v, 70w) of each phase by changing the number of turns of each of the armature windings (71) than in a case in which all the armature windings (71) of the same phase are connected together in series. This can increase the degree of design freedom.

Moreover, it is not necessary to provide a detection means for detecting the circulating current for each of the armature windings (71) to reduce the circulating current flowing through the armature winding group (70). It is thus possible to reduce the cost compared to the case in which the detection means is provided for each armature winding (71).

Further, the maximum value of the absolute values of the deviations of the amplitude values of the induced voltages appearing individually in the plurality of U-phase series armature winding sets (721u, 722u) of the same phase connected together in parallel based on the magnetic flux generated when a current flows through the suspension winding group (60) is set to be ⅓ or less of the maximum value of the absolute values of the deviations of the amplitude values of the induced voltages appearing individually in the armature windings (711u to 714u) included in the plurality of series armature winding sets (721u, 722u) of the same phase connected together in parallel based on the magnetic flux generated when a current flows through the suspension winding group (60). It is thus possible to reduce the circulating current flowing due to the voltage difference between the series armature winding sets (721u, 722u) compared to the case in which the maximum value of the absolute values of the deviations of the amplitude values of the induced voltages appearing individually in the plurality of series armature winding sets (721u, 722u) of the same phase exceeds ⅓ of the maximum value of the absolute values of the deviations of the induced voltages appearing individually in the armature windings (711u to 714u) included in the plurality of series armature winding sets (721u, 722u) of the same phase connected together in parallel based on the magnetic flux generated when a current flows through the suspension winding group (60).

Further, the maximum value of the absolute value of the difference between the induced voltages appearing individually in the plurality of series armature winding sets (721u, 722u) of the same phase connected together in parallel based on the magnetic flux generated when a current flows through the suspension winding group (60) is set to be ½ or less of the maximum value of the absolute values of the differences among the induced voltages appearing individually in the armature windings (711u to 714u) included in the plurality of series armature winding sets (721u, 722u) of the same phase connected together in parallel based on the magnetic flux generated when a current flows through the suspension winding group (60). It is thus possible to reduce the circulating current flowing due to the voltage difference between the series armature winding sets (721u, 722u) compared to the case in which the maximum value of the absolute value of the difference between the induced voltages appearing individually in the plurality of series armature winding sets (721u, 722u) of the same phase exceeds ½ of the maximum value of the absolute values of the differences among the induced voltages appearing individually in the armature windings (711u to 714u) included in the plurality of series armature winding sets (721u, 722u) of the same phase connected together in parallel based on the magnetic flux generated when a current flows through the suspension winding group (60).

Second Embodiment

Figure 8:
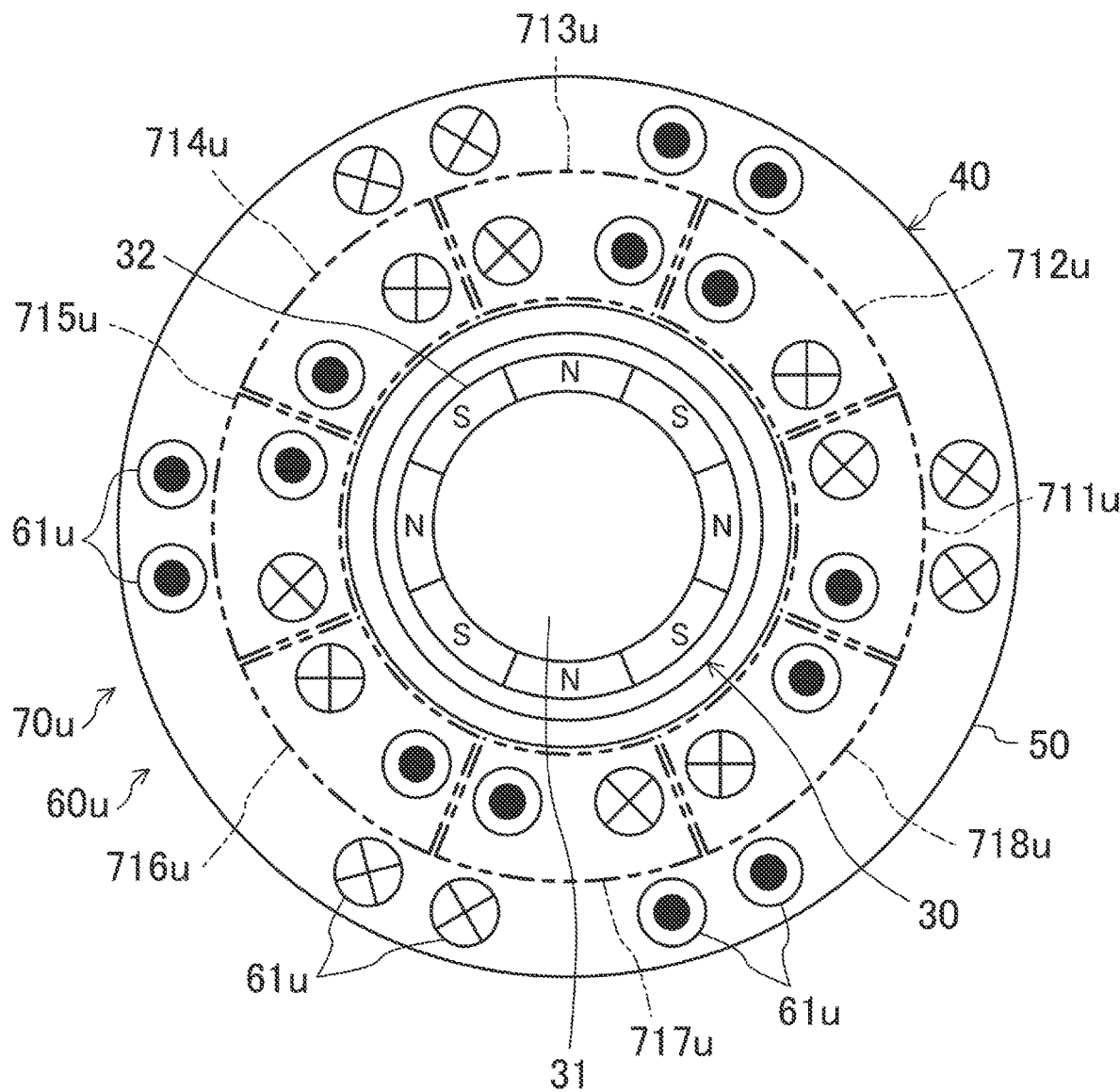
FIG. 8 is a view corresponding to FIG. 4, illustrating a second embodiment.

FIG. 8 is a view corresponding to FIG. 4, illustrating a second embodiment.

In the second embodiment, an eight-pole permanent magnet (32) is embedded near the outer circumferential surface (in an outer circumferential portion) of a rotor core (31). The eight-pole permanent magnet (32) is arranged such that N and S poles alternate near the outer circumferential surface at intervals of 45 degrees in the circumferential direction.

A suspension winding group (60) includes a U-phase suspension winding group (60u), a V-phase suspension winding group (not shown), and a W-phase suspension winding group (not shown).

The U-phase suspension winding group (60u) includes six U-phase suspension windings (61u). Likewise, each of the V-phase and W-phase suspension winding groups (not shown) also includes six suspension windings (61v, 61w).

Figure 9:
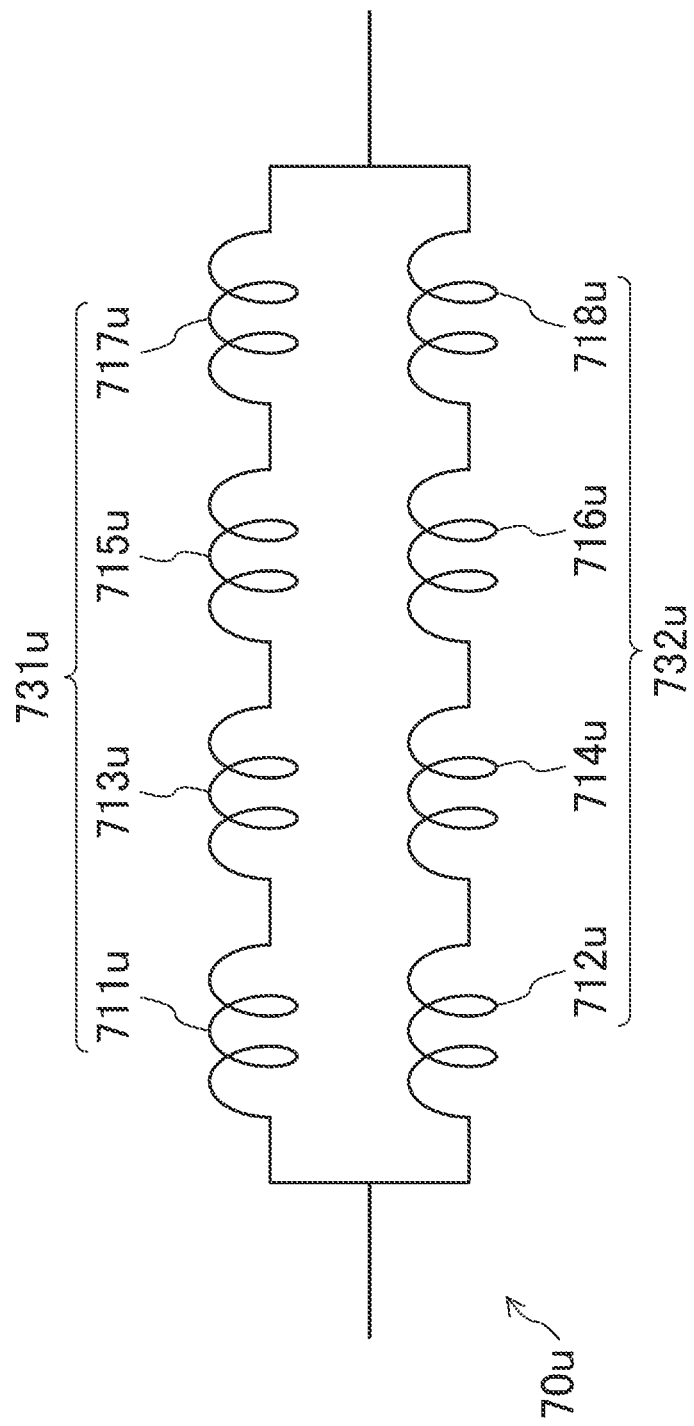
FIG. 9 is a view corresponding to FIG. 5, illustrating the second embodiment.

As illustrated in FIG. 9, the U-phase armature winding group (70u) includes first to eighth U-phase armature windings (711u to 718u). The first to eighth U-phase armature windings (711u to 718u) are spaced apart from one another equally in the circumferential direction and sequentially in a counterclockwise direction such that the winding axes of the armature windings (711u to 718u) adjacent to each other form an angle of 45°.

The U-phase armature winding group (70u) includes a first U-phase series armature winding set (731u) and a second U-phase series armature winding set (732u). The first U-phase series armature winding set (731) includes the first, third, fifth, and seventh U-phase armature windings (711u, 713u, 715u, 717u) connected together in series. The second U-phase series armature winding set (732u) includes the second, fourth, sixth and eighth U-phase armature windings (712u, 714u, 716u, 718u) connected together in series. Each U-phase series armature winding set (731u, 732u) includes four of the armature windings (711u to 718u) arranged such that the winding axes of the armature windings (711u to 718u) adjacent to each other form an angle of 90°. Each U-phase series armature winding set (731u, 732u) is configured as one sub-winding set including four (k) of the armature windings (711u to 718u) arranged such that the winding axes of the armature windings (711u to 718u) adjacent to each other form an angle of 90° (360°/k, where k=4). The first and second U-phase series armature winding sets (731u, 732u) are connected together in parallel. That is to say, each U-phase series armature winding set (731u, 732u) is connected in parallel with a series armature winding set of the same phase as the U-phase series armature winding set (731u, 732u), i.e., the other U-phase series armature winding set (731u, 732u).

The V-phase and W-phase armature winding groups (70v, 70w) are configured similarly to the U-phase armature winding group (70u).

The other configurations are the same as, or similar to, those of the first embodiment. Thus, the like reference characters are used to indicate the like components, and the detailed description will be omitted.

In the second embodiment, too, when the current flowing through the suspension winding group (60) changes, induced voltages (induced electromotive forces) with different absolute values appear in the first to eighth U-phase armature windings (711u to 718u) so as to cancel a change in magnetic flux corresponding to the changes in the current and magnet magnetic flux. At this time, the total voltage of the induced voltages produced in the first, third, fifth, and seventh U-phase armature windings (711u, 713u, 715u, 717u) by the changes in the current flowing through the suspension winding group (60) and the magnet magnetic flux corresponds to a voltage across the first U-phase series armature winding set (731u). Likewise, the total voltage of the induced voltages produced in the second, fourth, sixth, and eighth U-phase armature windings (712u, 714u, 716u, 718u) by the changes in the current flowing through the suspension winding group (60) and the magnet magnetic flux corresponds to a voltage across the second U-phase series armature winding set (732u).

Such wiring can decrease the difference between the induced voltages produced in the first and second U-phase series armature winding sets (731u, 732u) by the magnetic flux generated by the current passing through the suspension winding group (60) and the magnet magnetic flux. This can reduce the circulating current flowing due to the voltage difference between the first and second U-phase series armature winding sets (731u, 732u).

The V-phase and W-phase armature winding groups (70v, 70w) operate in the same manner as the U-phase armature winding group (70u).

It is thus possible to achieve the circulating current reduction effect similar to that of the first embodiment in the second embodiment as well.

Third Embodiment

Figure 10:
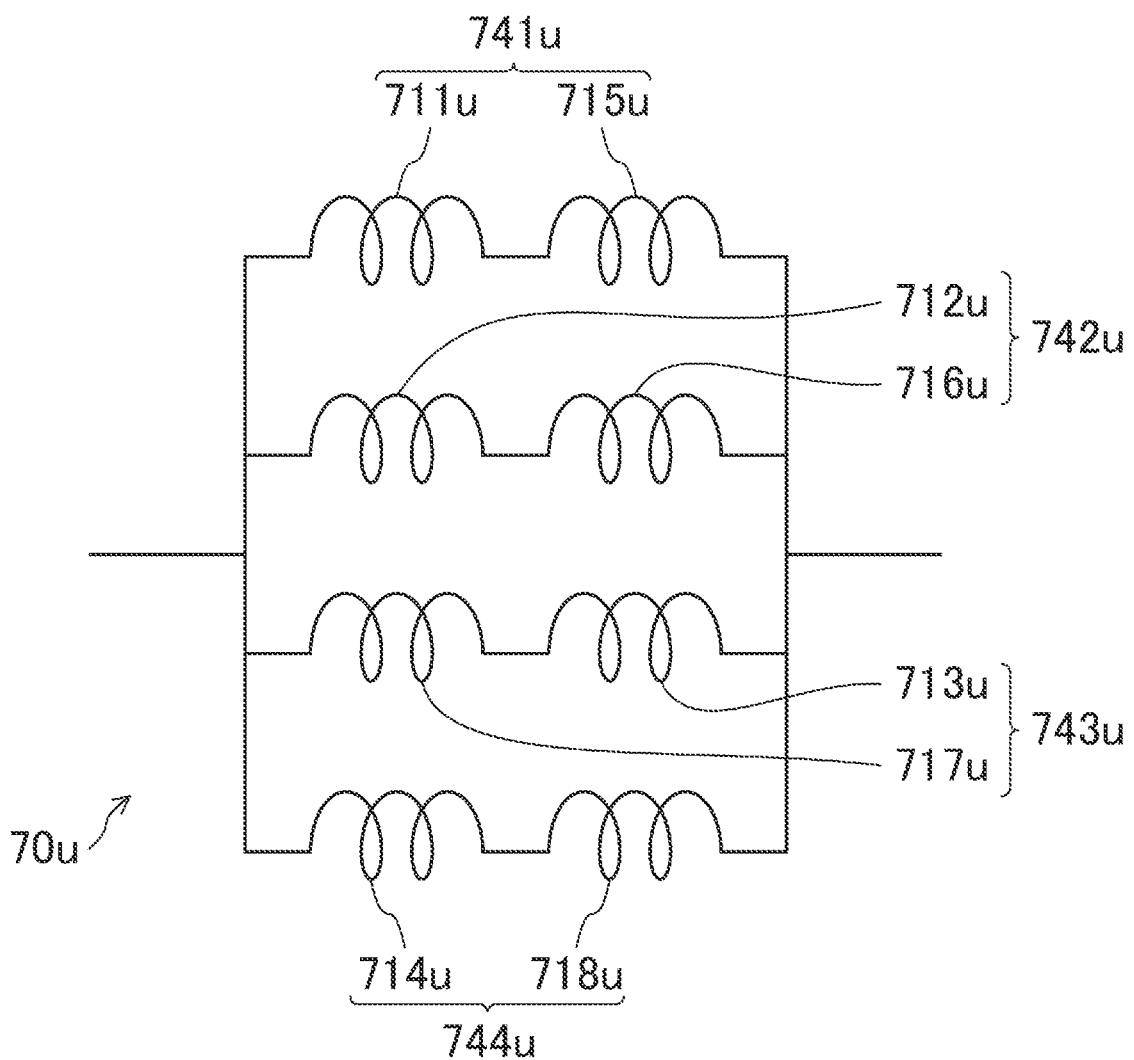
FIG. 10 is a view corresponding to FIG. 9, illustrating a third embodiment.

FIG. 10 is a view corresponding to FIG. 9, illustrating a third embodiment. In the third embodiment, the U-phase armature winding group (70u) includes first to fourth U-phase series armature winding sets (741u to 744u). The first U-phase series armature winding set (741u) includes first and fifth U-phase armature windings (711*u*, 715*u*). The second U-phase series armature winding set (742*u*) includes second and sixth U-phase armature windings (712*u*, 716*u*). The third U-phase series armature winding set (743*u*) includes third and seventh U-phase armature windings (713*u*, 717*u*). The fourth U-phase series armature winding set (744*u*) includes fourth and eighth U-phase armature windings (714*u*, 718*u*). Each U-phase series armature winding set (741*u* to 744*u*) includes two of the armature windings (711*u* to 718*u*) arranged such that the winding axes of the armature windings (711*u* to 718*u*) adjacent to each other form an angle of 180°. Each U-phase series armature winding set (741*u* to 744*u*) is configured as one sub-winding set including two (k) of the armature windings (711*u* to 718*u*) arranged such that the winding axes of the armature windings (711*u* to 718*u*) adjacent to each other form an angle of 180° (360°/k, where k=2). The first to fourth U-phase series armature winding sets (741*u* to 744*u*) are connected together in parallel. That is to say, each of the U-phase series armature winding sets (741*u* to 744*u*) is connected in parallel with series armature winding sets of the same phase as the U-phase series armature winding set (741*u* to 744*u*), i.e., the other U-phase series armature winding sets (741*u* to 744*u*).

The V-phase and W-phase armature winding groups (70*v*, 70*w*) are configured similarly to the U-phase armature winding group (70*u*).

The other configurations are the same as, or similar to, those of the second embodiment. Thus, the like reference characters are used to indicate the like components, and the detailed description will be omitted.

In the third embodiment, too, when the current flowing through the suspension winding group (60) changes, induced voltages (induced electromotive forces) with different absolute values appear in the first to eighth U-phase armature windings (711*u* to 718*u*) so as to cancel a change in magnetic flux corresponding to the changes in the current and magnet magnetic flux. At this time, the total voltage of the induced voltages produced in the first and fifth U-phase armature windings (711*u*, 715*u*) by the changes in the current flowing through the suspension winding group (60) and the magnet magnetic flux corresponds to a voltage across the first U-phase series armature winding set (741*u*). Likewise, the changes in the current flowing through the suspension winding group (60) and the magnet magnetic flux determine voltages across the second to fourth U-phase series armature winding sets (742*u* to 744*u*) as well.

Such wiring can decrease the difference among the induced voltages produced in the first to fourth U-phase series armature winding sets (741*u* to 744*u*) by the magnetic flux generated when a current flows through the suspension winding group (60) and the magnet magnetic flux. This can reduce the circulating current flowing due to the voltage differences among the first to fourth U-phase series armature winding sets (741*u* to 744*u*).

The V-phase and W-phase armature winding groups (70*v*, 70*w*) operate in the same manner as the U-phase armature winding group (70*u*).

It is thus possible to achieve the circulating current reduction effect similar to that of the second embodiment in the third embodiment.

Fourth Embodiment

Figure 11:
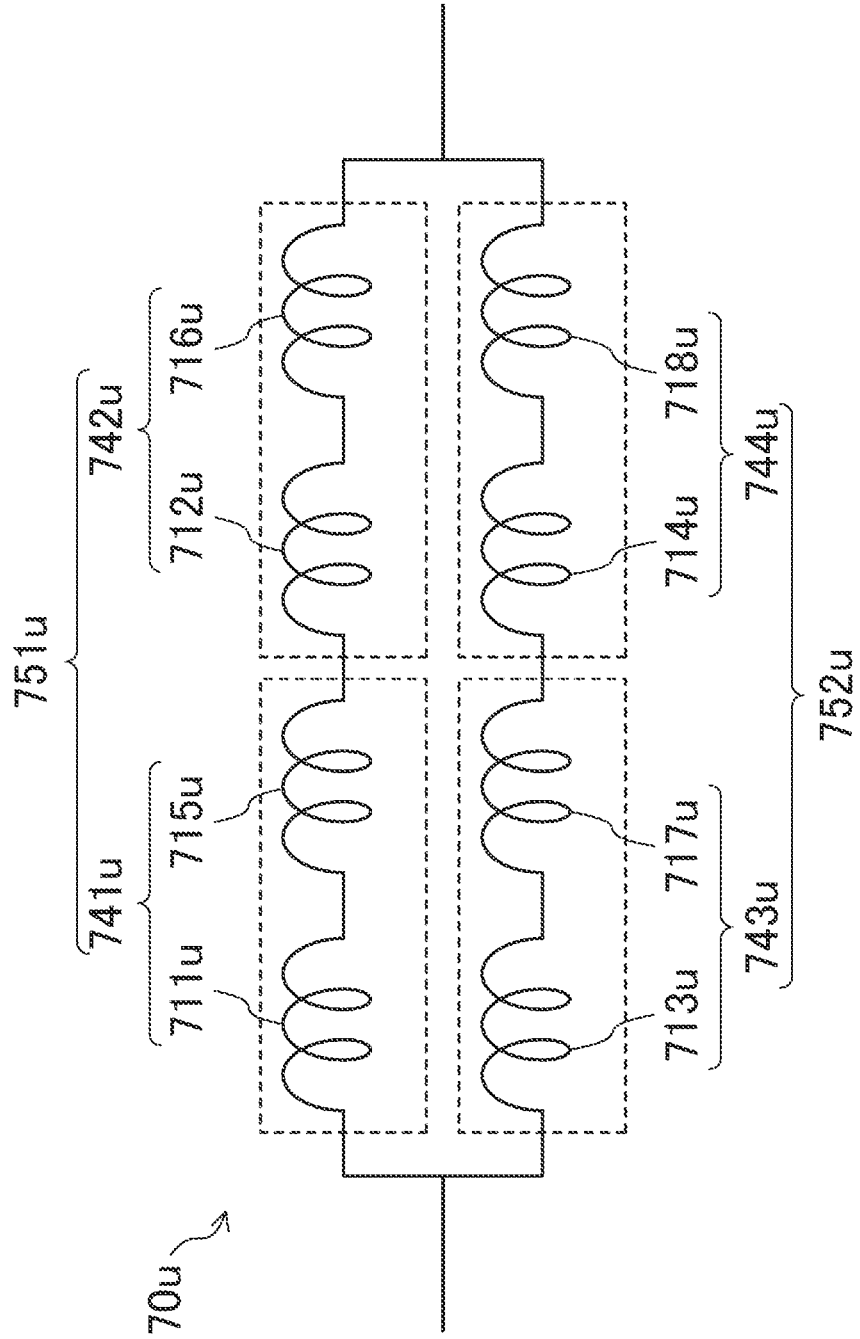
FIG. 11 is a view corresponding to FIG. 10, illustrating a fourth embodiment.

FIG. 11 is a view corresponding to FIG. 10, illustrating a fourth embodiment. In the fourth embodiment, the U-phase armature winding group (70*u*) includes first and second U-phase series armature winding sets (751*u*, 752*u*). The first U-phase series armature winding set (751*u*) includes the first and second U-phase series armature winding sets (741*u*, 742*u*) of the third embodiment, i.e., the first, second, fifth, and sixth U-phase armature windings (711*u*, 712*u*, 715*u*, 716*u*). The second U-phase series armature winding set (752*u*) includes the third and fourth U-phase series armature winding sets (743*u*, 744*u*) of the third embodiment, i.e., the third, fourth, seventh, and eighth U-phase armature windings (713*u*, 714*u*, 717*u*, 718*u*).

Each U-phase series armature winding set (751*u* to 752*u*) includes two sub-winding sets each including two (k) of the armature windings (711*u* to 718*u*) arranged such that the winding axes of the armature windings (711*u* to 718*u*) adjacent to each other form an angle of 180° (360°/k, where k=2). The first and second U-phase series armature winding sets (751*u*, 752*u*) are connected together in parallel. That is to say, each of the U-phase series armature winding sets (751*u*, 752*u*) is connected in parallel with a series armature winding set of the same phase as the U-phase series armature winding set (751*u*, 752*u*), i.e., the other U-phase series armature winding set (751*u*, 752*u*).

The V-phase and W-phase armature winding groups (70*v*, 70*w*) are configured similarly to the U-phase armature winding group (70*u*).

The other configurations are the same as, or similar to, those of the third embodiment. Thus, the like reference characters are used to indicate the like components, and the detailed description will be omitted.

In the fourth embodiment, too, when the current flowing through the suspension winding group (60*u*) changes, induced voltages (induced electromotive forces) with different absolute values appear in the first to eighth U-phase armature windings (711*u* to 718*u*) so as to cancel a change in magnetic flux corresponding to the changes in the current and magnet magnetic flux. At this time, the difference between the induced voltages produced in the first and second U-phase series armature winding sets (751*u*, 752*u*) by the changes in the current flowing through the suspension winding group (60*u*) and the magnet magnetic flux can be reduced. The V-phase and W-phase armature winding groups (70*v*, 70*w*) operate in the same manner as the U-phase armature winding group (70*u*).

It is thus possible to achieve the circulating current reduction effect similar to that of the third embodiment in the fourth embodiment.

The first and second U-phase series armature winding sets (741*u*, 742*u*) of the third embodiment are connected together in series, and the third and fourth U-phase series armature winding sets (743*u*, 744*u*) of the third embodiment are connected together in series. It is thus possible to make a connecting wire shorter than that in the third embodiment. This can reduce the size of the bearingless motor (20).

Fifth Embodiment

Figure 12:
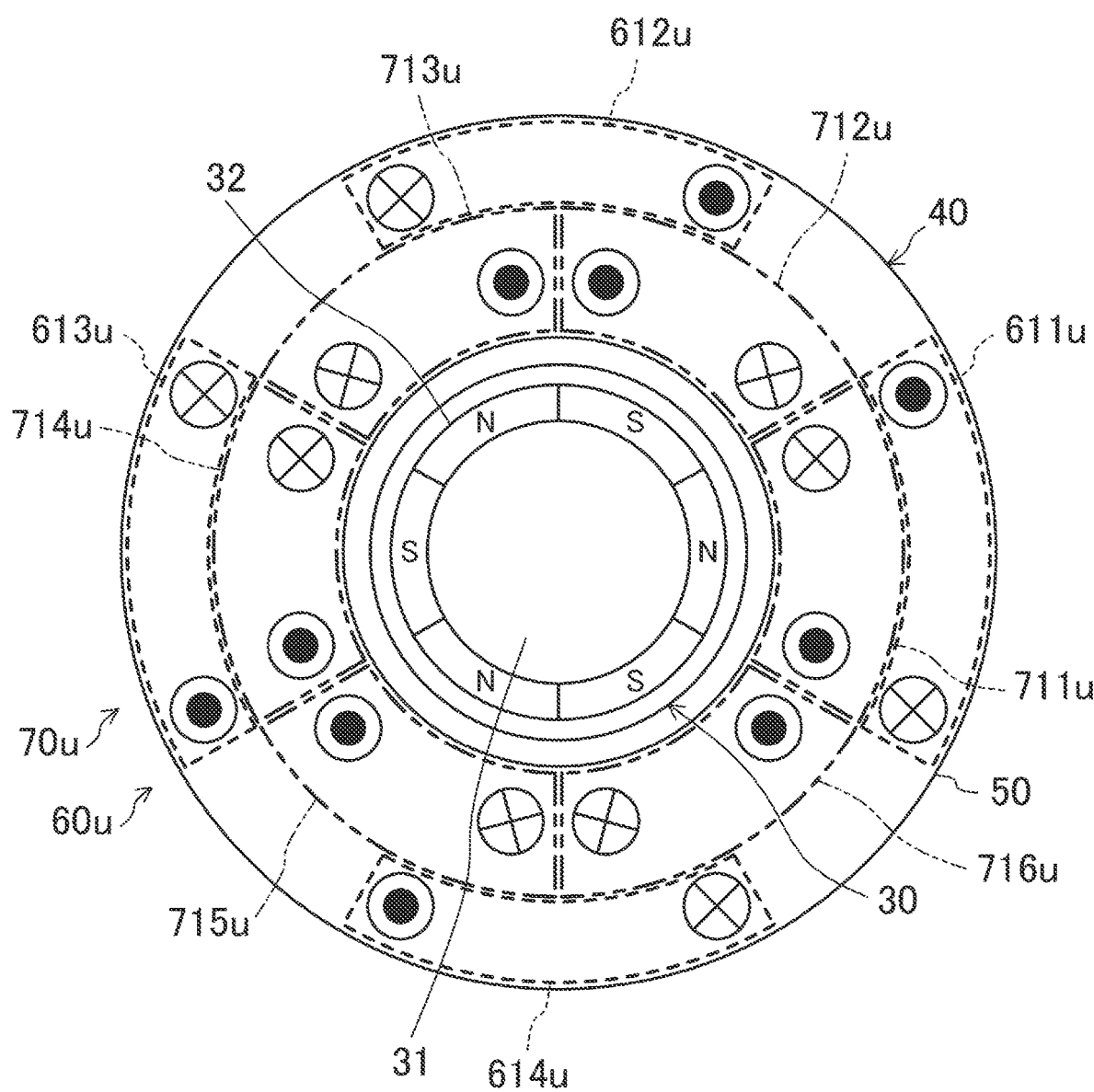
FIG. 12 is a view corresponding to FIG. 4, illustrating a fifth embodiment.

FIG. 12 is a view corresponding to FIG. 4, illustrating a fifth embodiment.

In the fifth embodiment, a six-pole permanent magnet (32) is embedded near the outer circumferential surface (in an outer circumferential portion) of a rotor core (31). The permanent magnet (32) is arranged such that N and S poles alternate at intervals of 60 degrees in the circumferential direction.

A suspension winding group (60) includes a U-phase suspension winding group (60*u*), a V-phase suspension winding group (not shown), and a W-phase suspension winding group (not shown).

The U-phase suspension winding group (60*u*) includes first to fourth U-phase suspension windings (611*u* to 614*u*). The first to fourth U-phase suspension windings (611*u* to 614*u*) are spaced apart from one another equally in the circumferential direction and sequentially in a counterclockwise direction such that the winding axes of the suspension windings (611*u* to 614*u*) adjacent to each other form an angle of 90°.

The U-phase suspension winding group (60*u*) includes a first U-phase series suspension winding set (621*u*) and a second U-phase series suspension winding set (622*u*). The first U-phase series suspension winding set (621*u*) includes the first and third U-phase suspension windings (611*u*, 613*u*) connected together in series. The second U-phase series suspension winding set (622*u*) includes the second and fourth U-phase suspension windings (612*u*, 614*u*) connected together in series. Each U-phase series suspension winding set (621*u*, 622*u*) includes two of the suspension windings (611*u* to 614*u*) arranged such that the winding axes of the suspension windings (611*u* to 614*u*) adjacent to each other form an angle of 180°. Each U-phase series suspension winding set (621*u*, 622*u*) is configured as one sub-winding set including two (k) of the suspension windings (611*u* to 614*u*) arranged such that the winding axes of the suspension windings (611*u* to 614*u*) adjacent to each other form an angle of 180° (360°/k, where k=2). The first and second U-phase series suspension winding sets (621*u*, 622*u*) are connected together in parallel. That is to say, each of the U-phase series suspension winding sets (621*u*, 622*u*) is connected in parallel with a series suspension winding set of the same phase as the U-phase series suspension winding set (621*u*, 622*u*), i.e., the other U-phase series suspension winding set (621*u*, 622*u*).

The V-phase and W-phase suspension winding groups (60*v*, 60*w*) are configured similarly to the U-phase suspension winding group (60*u*).

The U-phase armature winding group (70*u*) includes first to sixth U-phase armature windings (711*u* to 716*u*). The first to sixth U-phase armature windings (711*u* to 716*u*) are spaced apart from one another equally in the circumferential direction and sequentially in a counterclockwise direction such that the winding axes of the armature windings (711*u* to 716*u*) adjacent to each other form an angle of 60°.

Figure 13:
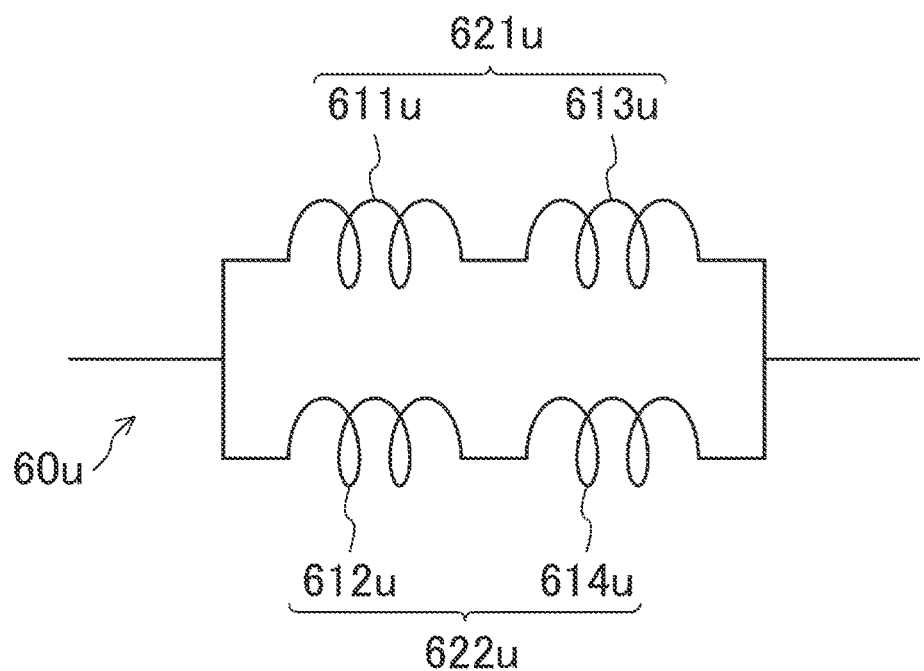
FIG. 13 is a circuit diagram of a U-phase suspension winding group according to the fifth embodiment.
Figure 14:
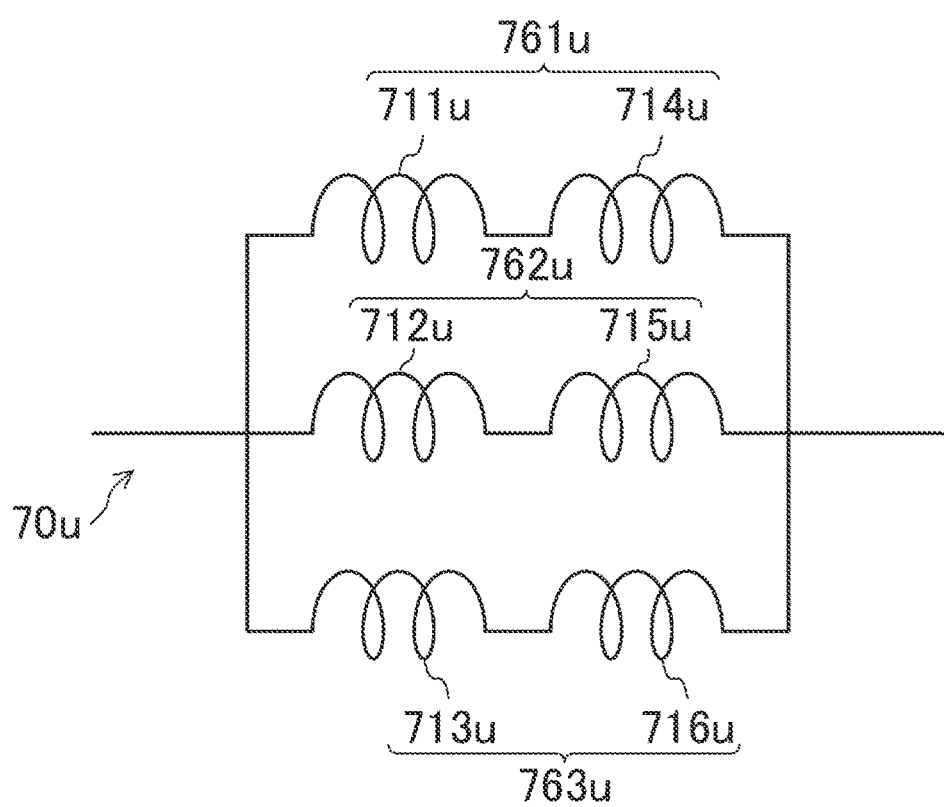
FIG. 14 is a view corresponding to FIG. 5, illustrating the fifth embodiment.

As illustrated in FIG. 13, the U-phase armature winding group (70*u*) includes first to third U-phase series armature winding sets (761*u* to 763*u*). The first U-phase series armature winding set (761*u*) includes first and fourth U-phase armature windings (711*u*, 714*u*). The second U-phase series armature winding set (762*u*) includes second and fifth U-phase armature windings (712*u*, 715*u*). The third U-phase series armature winding set (763*u*) includes third and sixth U-phase armature windings (713*u*, 716*u*). Each U-phase series armature winding set (761*u* to 763*u*) includes two of the armature windings (711*u* to 716*u*) arranged such that the winding axes of the armature windings (711*u* to 716*u*) adjacent to each other form an angle of 180°. Each U-phase series armature winding set (761*u* to 763*u*) is configured as one sub-winding set including two (k) of the armature windings (711*u* to 716*u*) arranged such that the winding axes of the armature windings (711*u* to 716*u*) adjacent to each other form an angle of 180° (360°/k, where k=2). The first to third U-phase series armature winding sets (761*u* to 763*u*) are connected together in parallel. That is to say, each of the U-phase series armature winding sets (761*u* to 763*u*) is connected in parallel with series armature winding sets of the same phase as the U-phase series armature winding set (761*u* to 763*u*), i.e., the other U-phase series armature winding sets (761*u* to 763*u*).

The V-phase and W-phase armature winding groups (70*v*, 70*w*) are configured similarly to the U-phase armature winding group (70*u*).

The other configurations are the same as, or similar to, those of the first embodiment. Thus, the like reference characters are used to indicate the like components, and the detailed description will be omitted.

In the fifth embodiment, too, when the current flowing through the suspension winding group (60) and the magnet magnetic flux change, induced voltages (induced electromotive forces) with different absolute values appear in the first to sixth U-phase armature windings (711*u* to 716*u*) so as to cancel a change in magnetic flux corresponding to the changes in the current and the magnet magnetic flux. At this time, the difference among the induced voltages produced in the first to third U-phase series armature winding sets (761*u* to 763*u*) by the change in the current flowing through the suspension winding group (60) and the change in the magnet magnetic flux decreases. The V-phase and W-phase armature winding groups (70*v*, 70*w*) operate in the same manner as the U-phase armature winding group (70*u*).

It is thus possible to achieve the circulating current reduction effect similar to that of the first embodiment in the fifth embodiment as well.

When the current flowing through the armature winding group (70) and the magnet magnetic flux change, induced voltages (induced electromotive forces) with different absolute values appear in the first to fourth U-phase suspension windings (611*u* to 614*u*) so as to cancel a change in magnetic flux corresponding to the changes in the current and magnet magnetic flux. At this time, the difference between the induced voltages produced in the first and second U-phase series suspension winding sets (621*u*, 622*u*) by the change in the current flowing through the armature winding group (70) and the change in the magnet magnetic flux decreases. The V-phase and W-phase suspension winding groups (60*v*, 60*w*) operate in the same manner as the U-phase suspension winding group (60*u*).

Since it is possible to decrease the difference between the induced voltages produced in the first and second U-phase series suspension winding sets (621*u*, 622*u*) by the magnetic flux generated by a current passing through the armature winding group (70) and magnet magnetic flux, it is possible to reduce the circulating current flowing due to the voltage difference between the first and second U-phase series suspension winding sets (621*u*, 622*u*).

In the fifth embodiment, a maximum value of the absolute values of the deviations of the amplitude values of the induced voltages appearing individually in the plurality of U-phase (same phase) series suspension winding sets (621*u*, 622*u*) connected together in parallel based on the magnetic flux generated when a current flows through the armature winding group (70) is ⅓ or less of a maximum value of the absolute values of the deviations of the amplitude values of the induced voltages appearing individually in the suspension windings (611*u* to 614*u*) included in the plurality of U-phase series suspension winding sets (621*u*, 622*u*) connected together in parallel based on the magnetic flux generated when a current flows through the armature winding group (70). This relationship holds true also for the V-phase and W-phase suspension winding groups (60*v*, 60*w*).

Thus, the maximum value of the absolute values of the deviations of the amplitude values of the induced voltages appearing individually in the plurality of U-phase series suspension winding sets (621u, 622u) connected together in parallel based on the magnetic flux generated when a current flows through the armature winding group (70) is less than the maximum value of the absolute values of the deviations of the amplitude values of the induced voltages appearing individually in the suspension windings (611u to 614u) included in the plurality of U-phase series suspension winding sets (621u, 622u) connected together in parallel based on the magnetic flux generated when a current flows through the armature winding group (70). This relationship holds true also for the V-phase and W-phase suspension winding groups (60v, 60w).

The maximum value of the absolute value of the difference between the induced voltages appearing individually in the plurality of U-phase (same phase) series suspension winding sets (621u, 622u) connected together in parallel based on the magnetic flux generated when a current flows through the armature winding group (70) is ½ or less of a maximum value of the absolute values of the differences among the induced voltages appearing individually in the suspension windings (611u to 614u) included in the plurality of U-phase series suspension winding sets (621u, 622u) connected together in parallel based on the magnetic flux generated when a current flows through the armature winding group (70). This relationship holds true also for the V-phase and W-phase suspension winding groups (60v, 60w).

Thus, in the fifth embodiment, since the suspension winding group (60) includes the plurality of series suspension winding sets (621u, 622u) including the plurality of suspension windings (61) of the same phase, it is possible to make a connecting wire shorter than in a case in which the suspension windings (61) constituting the suspension winding group (60) are connected together in parallel. This can reduce the size of the bearingless motor (20).

Further, since the plurality of series suspension winding sets (621u, 622u) are connected together in parallel, it is possible to more finely adjust the voltage between both terminals of the suspension winding group (60u, 60v, 60w) of each phase by changing the number of turns of each of the suspension windings (61) than in a case in which the suspension windings (61) of the same phase are connected together in series. This can increase the degree of design freedom.

Moreover, it is not necessary to provide a detection means for detecting the circulating current for each of the suspension windings (61) to reduce the circulating current flowing through the suspension winding group (60). It is thus possible to reduce the cost compared to the case in which the detection means is provided for each suspension winding (61).

Other Embodiments

In each of the first to fifth embodiments, the suspension windings (61) and the armature windings (71) are wound on the teeth (52) by the distributed winding method, but may be wound by a concentrated winding method.

In each of the first to fifth embodiments, each of the U-phase series armature winding sets (751u to 752u) includes one or two sub-winding sets, but may include one or more sub-winding sets or may include three sub-winding sets or more.

In the second embodiment, the number of the U-phase suspension windings (61u) provided for the U-phase suspension winding group (60u) is six, but may be ten. The number of the U-phase suspension windings (61u) provided for the U-phase suspension winding group (60u) may be the number of poles±two. The same statement applies to the V-phase and W-phase suspension winding groups.

While the embodiments have been described above, it will be understood that various changes in form and details can be made without departing from the spirit and scope of the claims. The embodiments and variations described above may be appropriately combined or modified by replacing the elements as long as the functions of the subject matter of the present disclosure are not impaired.

The present disclosure is useful as an electric motor, a compressor, and a refrigeration apparatus.

The invention claimed is:

1. An electric motor comprising:
   a rotor; and
   a stator, the stator including
   a stator core including a back yoke in a circular shape and a plurality of teeth protruding radially inward of the back yoke,
   a suspension winding group including a plurality of suspension windings wound on the teeth so as to pass through slots, each formed between the plurality of teeth, the suspension windings generating an electromagnetic force that supports the rotor in a non-contact manner due to passage of current, and the suspension windings generating a magnetic pole inside the stator, and
   an armature winding group including a plurality of armature windings wound on the teeth so as to pass through the slots, each formed between the plurality of teeth, the armature windings generating an electromagnetic force that rotationally drives the rotor by passage of current, and the armature windings generating a magnetic pole inside the stator,
   one of the suspension winding group or the armature winding group including a plurality of series winding sets that each include a plurality of windings of a same phase connected together in series,
   each of the series winding sets being connected in parallel with an other one of the series winding sets including the plurality of windings having a different winding axis from and being of a same phase as that of the plurality of windings included in the series winding sets,
   each of the series winding sets including one or more sub-winding sets, and each of the one or more sub-winding sets includes k windings arranged such that winding axes of the windings adjacent to each other form an angle of 360°/k,
   the suspension winding group and the armature winding group being wired so that a total voltage of induced voltages produced in the windings included in each of the series winding sets by a change in the current flowing through the other winding group and a change in a magnet magnetic flux corresponds to a voltage across the series winding set, and
   a maximum value of an absolute value of a difference between induced voltages appearing individually in the plurality of series winding sets of the same phase connected together in parallel based on a magnetic flux generated when a current flows through the other winding group being less than a maximum value of an absolute value of a difference between induced voltages appearing individually in the windings included in the plurality of series winding sets of the same phase connected together in parallel based on the magnetic flux generated when a current flows through the other winding group.

2. The electric motor of claim 1, wherein
a maximum value of absolute values of deviations of amplitude values of the induced voltages appearing individually in the plurality of series winding sets of the same phase connected together in parallel based on the magnetic flux generated when a current flows through the other winding group is $\frac{1}{3}$ or less of
a maximum value of absolute values of deviations of amplitude values of induced voltages appearing individually in the windings included in the plurality of series winding sets of the same phase connected together in parallel based on the magnetic flux generated when a current flows through the other winding group.

3. A compressor including the electric motor of claim 2.

4. A refrigeration apparatus including the compressor of claim 3.

5. The electric motor of claim 1, wherein
the maximum value of the absolute value of the difference between the induced voltages appearing individually in the plurality of series winding sets of the same phase connected together in parallel based on the magnetic flux generated when a current flows through the other winding group is $\frac{1}{2}$ or less of
the maximum value of the absolute value of the difference between the induced voltages appearing individually in the windings included in the plurality of series winding sets of the same phase connected together in parallel based on the magnetic flux generated when a current flows through the other winding group.

6. A compressor including the electric motor of claim 5.

7. A refrigeration apparatus including the compressor of claim 6.

8. A compressor including the electric motor of claim 1.

9. A refrigeration apparatus including the compressor of claim 8.

* * * * *